United States Patent
Cordray et al.

(10) Patent No.: US 6,928,440 B2
(45) Date of Patent: Aug. 9, 2005

(54) DELAYED STORAGE OF COOKIES WITH APPROVAL CAPABILITY

(75) Inventors: David A. Cordray, Round Rock, TX (US); Jerry Walter Malcolm, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 09/838,364

(22) Filed: Apr. 19, 2001

(65) Prior Publication Data

US 2002/0156781 A1 Oct. 24, 2002

(51) Int. Cl.[7] .............................................. G06F 17/30
(52) U.S. Cl. .............................. 707/9; 707/1; 707/200; 709/217
(58) Field of Search .................... 707/1–10, 100–104.1, 707/200–206; 709/229, 217, 219

(56) References Cited

U.S. PATENT DOCUMENTS

| | | | | |
|---|---|---|---|---|
| 5,774,670 A | * | 6/1998 | Montulli | 709/227 |
| 6,134,592 A | * | 10/2000 | Montulli | 709/229 |
| 6,237,033 B1 | * | 5/2001 | Doeberl et al. | 709/223 |
| 6,421,729 B1 | * | 7/2002 | Paltenghe et al. | 709/229 |

* cited by examiner

*Primary Examiner*—Shahid Alam
*Assistant Examiner*—Jean Bolte Fleurantin
(74) *Attorney, Agent, or Firm*—Duke W. Yee; Marilyn Smith Dawkins; Stephen J. Walder, Jr.

(57) ABSTRACT

A method, apparatus, and computer instructions for managing cookies in a data processing system. A cookie is received during a browser program session. The cookie is only stored in a temporary data store within the data processing system for a duration of the browser program session. The cookies stored in the temporary data store may be displayed in response to a signal to terminate the browser program session. Cookies are selectively stored in a persistent storage, based on user input.

30 Claims, 4 Drawing Sheets

Figure 1
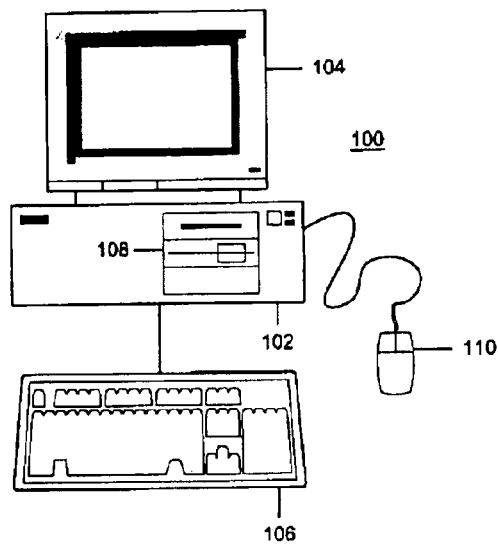
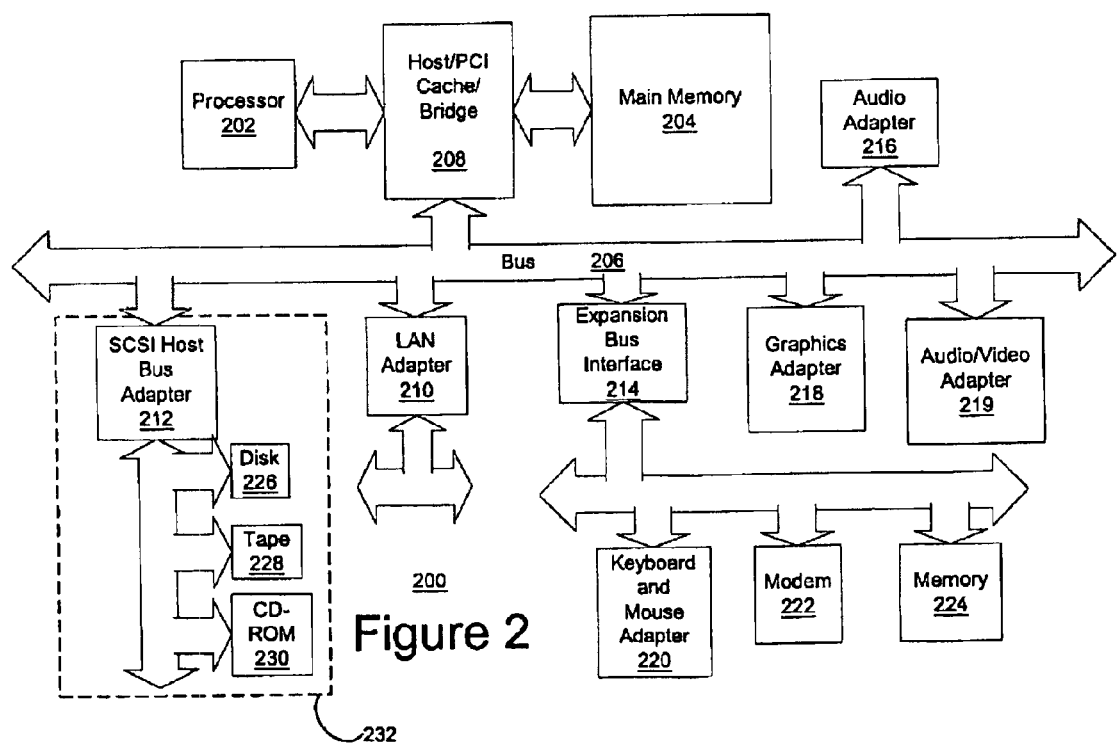
Figure 2

Figure 6
Figure 7
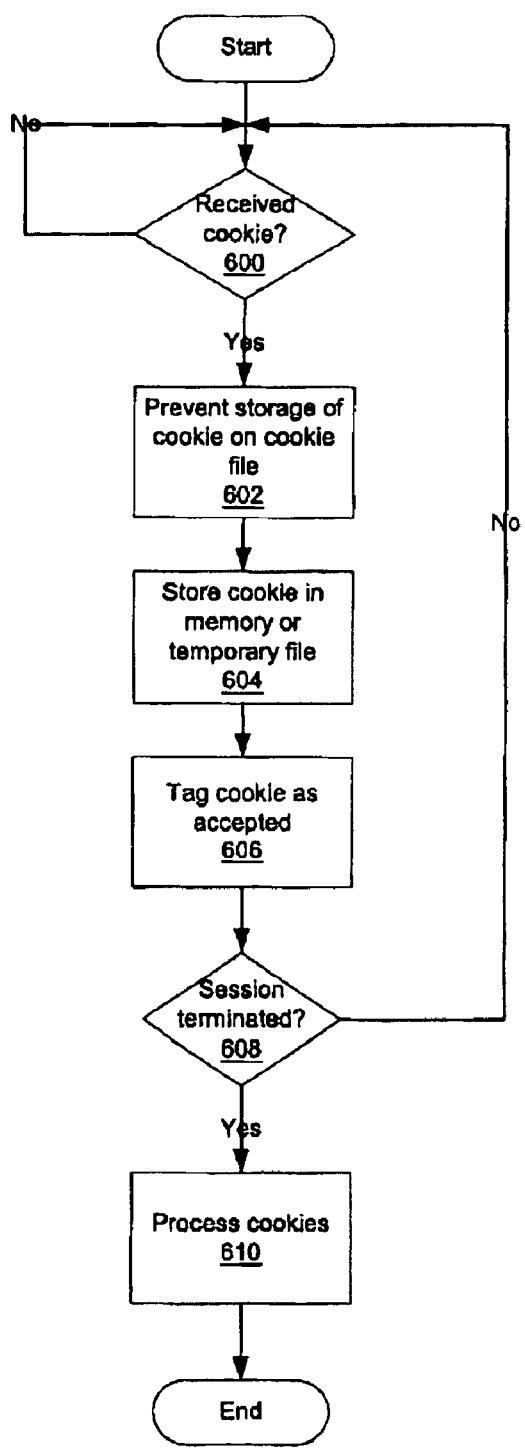
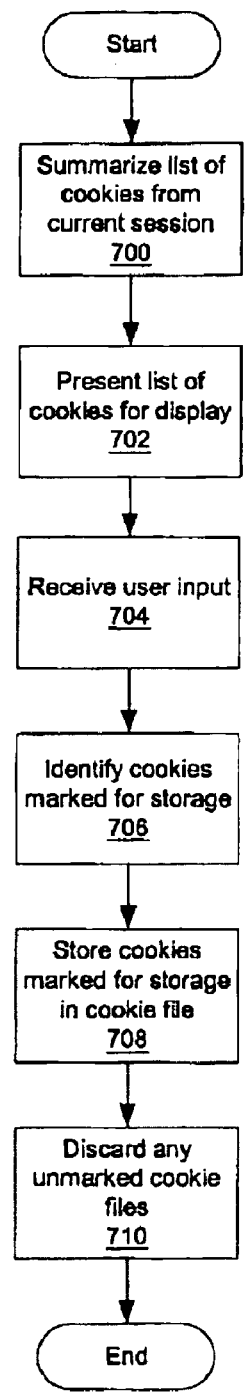

DELAYED STORAGE OF COOKIES WITH APPROVAL CAPABILITY

BACKGROUND OF THE INVENTION

1. Technical Field

The present invention relates generally to an improved data processing system. Still more particularly, the present invention relates to the storage of cookie files on a user's computer system.

2. Description of Related Art

The Internet, also referred to as an "internetwork", is a set of computer networks, possibly dissimilar, joined together by means of gateways that handle data transfer and the conversion of messages from protocols of the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database. The HTML file also contains data, which may not be displayed at the browser. This "hidden" data may be used to store information or execute programs without the user's knowledge of the existence or purpose of the information or program.

A hidden data field, which may be included in the HTTP header of an HTML file, is a "cookie" data field. A cookie is an HTTP protocol header document element, which may be used to provide multiple data elements to the browser. Server sites do one of three things: (1) does not send cookies; (2) sends transient cookies; and (3) sends persistent cookies. Some cookies may be specified by the server site as persistent, implying that they will be stored on the user's hard drive and remain available even if the user closes the browser or reboots the machine. Other cookies are transient and will only persist while the current browser session is open. In response to receiving an HTML file with a cookie, the browser may store the cookie data elements in a file, which are usually kept in a profile directory for the browser. Also, a different cookie file may be present for each user profile (e.g. each person in a family can have their own profile on the same computer with their own cookie file). These cookie data elements are also referred to as "cookies". Once a cookie is sent to the browser computer, the server expects the cookie to be returned in the HTTP header of subsequent messages sent from the browser to the server. The inclusion of the cookie in the HTTP header of messages from the browser is done without the user's awareness. In this manner, the operator of the server may identify repeat visitors to the server site.

The Internet also is widely used to transfer applications to users using browsers. With respect to commerce on the Web, individual consumers and businesses use the Web to purchase various goods and services. Some companies offer goods and services solely on the Web while others use the Web to extend their reach. A cookie provides a way for a Web site to keep track of a user's patterns and preferences, and potentially store the cookie on the user's computer. The storage of a cookie may be the unauthorized storage of data on another user's computer. The cookie may be used for tracking the user and his or her requests for information from the server site without the user's knowledge or permission.

Browsers typically accept all cookies as a default option. A browser also may allow a user to disable the acceptance of cookies entirely. The browser may include an option to determine whether to accept cookies. While this option disables the acceptance of cookies, this option does notify a user that a cookie was detected. A browser may also accept all cookies, but only return cookies to the originating site. Browsers also have an "ask me each time" option. This option asks a user whether to accept a cookie every time a cookie is presented for acceptance. This option, however, becomes tiresome quickly. A user may receive three or four pop-ups on every Web page in which a yes or no response is required.

Some Web sites may not function properly when the acceptance of cookies is disabled by the browser. Therefore, a user may not be able to access a Web site without having cookies accepted by the browser.

The user basically has two options: 1) disable cookies and then not be able to talk to a vast number of Web sites (many of which the user trusts and does not care if cookies are sent) or 2) enable cookies and get all of the downside of cookies.

Therefore, it would be advantageous to have an improved method and apparatus for managing acceptance and storage of cookies on a data processing system.

SUMMARY OF THE INVENTION

The present invention provides a method, apparatus, and computer instructions for managing cookies in a data processing system. A cookie is received during a browser program session. The cookie is only stored in a temporary data store within the data processing system for a duration of the browser program session. The cookies stored in the temporary data store may be displayed in response to a signal to terminate the browser program session. Cookies are selectively stored in a persistent storage, based on user input.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the present invention may be implemented in accordance with a preferred embodiment of the present invention;

FIG. 2 is a block diagram of a data processing system in which the present invention may be implemented;

FIG. 6 is a flowchart of process for managing receipt of cookies in accordance with a preferred embodiment of the present invention; and FIG. 7 is a flowchart of method for processing cookies in accordance with a preferred embodiment of the present invention.

DETAILED DESCRIPTION OF THE PREFERRED EMBODIMENT

Figure 3:
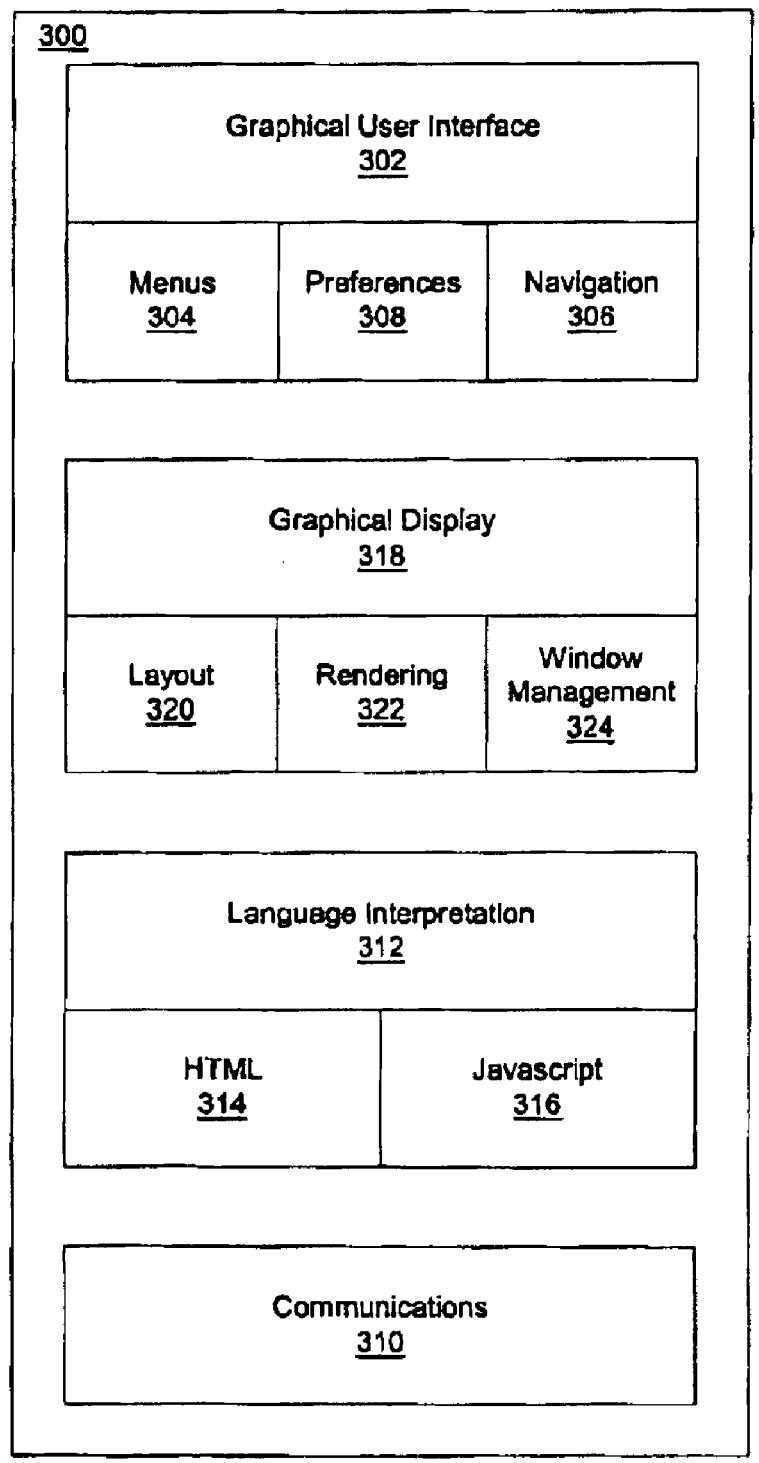
FIG. 3 is a block diagram of a browser program in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide nonvolatile memory for storing operating system files and/or user-generated data.

The depicted example in FIG. 2 and above-described examples are not meant to imply architectural limitations.

For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Turning next to FIG. 3, a block diagram of a browser program is depicted in accordance with a preferred embodiment of the present invention. A browser is an application used to navigate or view information or data in a distributed database, such as the Internet or the World Wide Web.

In this example, browser 300 includes a user interface 302, which is a graphical user interface (GUI) that allows the user to interface or communicate with browser 300. This interface provides for selection of various functions through menus 304 and allows for navigation through navigation 306. For example, menu 304 may allow a user to perform various functions, such as saving a file, opening a new window, displaying a history, and entering a URL. Navigation 306 allows for a user to navigate various pages and to select web sites for viewing. For example, navigation 306 may allow a user to see a previous page or a subsequent page relative to the present page. Preferences such as those illustrated in FIG. 3 may be set through preferences 308.

Communications 310 is the mechanism with which browser 300 receives documents and other resources from a network such as the Internet. Further, communications 310 is used to send or upload documents and resources onto a network. In the depicted example, communication 310 uses HTTP. Other protocols may be used depending on the implementation. The mechanism of the present invention may be implemented as processes within communication 310 to manage cookies as they are received for storage from sources, such as Web sites that send documents and other content to a user of browser 300.

Documents that are received by browser 300 are processed by language interpretation 312, which includes an HTML unit 314 and a JavaScript unit 316. Language interpretation 312 will process a document for presentation on graphical display 318. In particular, HTML statements are processed by HTML unit 314 for presentation while JavaScript statements are processed by JavaScript unit 316.

Graphical display 318 includes layout unit 320, rendering unit 322, and window management 324. These units are involved in presenting web pages to a user based on results from language interpretation 312.

Browser 300 is presented as an example of a browser program in which the present invention may be embodied. Browser 300 is not meant to imply architectural limitations to the present invention. Presently available browsers may include additional functions not shown or may omit functions shown in browser 300. A browser may be any application that is used to search for and display content on a distributed data processing system. Browser 300 make be implemented using known browser applications, such as Netscape Navigator or Microsoft Internet Explorer. Netscape Navigator is available from Netscape Communications Corporation while Microsoft Internet Explorer is available from Microsoft Corporation.

The present invention accepts all cookies with an only-return-to-originator option if desired. The browser will basically tell the server that it is accepting and storing all persistent cookies on the hard drive. Thus, the server sees no difference. The browser, however, does not actually write these persistent cookies to the file until later. The user may then view the list of cookies that are scheduled to be written and choose to save or discard them. If the browser closes before writing the cookies, they are all discarded. Not writing cookies simply makes the server think the user is a first-time visitor the next time the user visits that site, which likely is the precise intent of the user.

Figure 4:
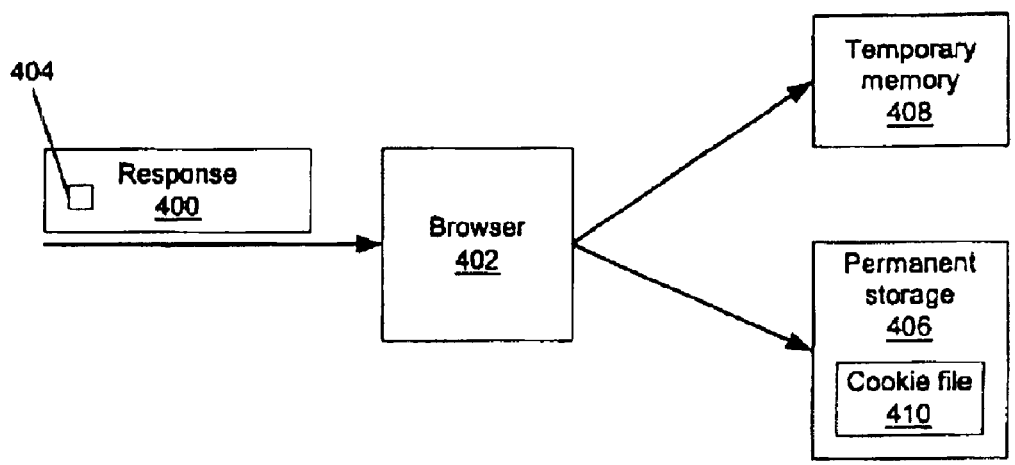
FIG. 4 is a diagram of components used in managing receipt and storage of cookies in accordance with a preferred embodiment of the present invention.

With reference to FIG. 4, a diagram of components used in managing receipt and storage of cookies is depicted in accordance with a preferred embodiment of the present invention. The browser issues a request to a server and the server responds with a response. The response may contain a cookie, and the accepted protocol is that the browser will dutifully keep up with that cookie (either permanently or temporarily as specified by the type of cookie). Response 400 may be sent to browser 402. In these examples, response 400 is a HTTP response made in response to browser 402. When response 400 contains cookie 404, cookie 404 may be stored in permanent storage 406 or in temporary memory 408. In these examples, memory 408 is system memory in a data processing system, such as main memory 204 in FIG. 2. Memory 408 is used as a temporary data store in these examples. When stored in permanent storage 406, cookie 404 is typically placed in a file, such as cookie file 410 for use by browser 402. Permanent storage 406 may take various forms depending on the implementation, such as, for example, hard disk drive, an optical disc, or a flash memory.

Normally, browser 402 receives a request, such as response 400 to accept cookie 404. Upon accepting cookie 404, this cookie is normally placed into cookie file 410 as well as in temporary memory 408 for use during the session in which the user makes requests through browser 402 for various content, such as Web pages, audio files, or images. A session is the time from which browser 402 starts execution to the time at which browser 402 terminates execution.

The present invention provides a method, apparatus, and computer implemented instructions for handling cookies received at browser 402. This invention does not address the transient cookies, only the persistent cookies. The mechanism of the present invention accepts all cookies presented to browser 402 without saving all of the cookies in permanent storage 406. The cookies are stored in temporary memory 408 in this example for use while browser 402 is executing. When execution of browser 402 is to be terminated all cookies within temporary storage are presented to a user. Selected cookies may be stored in cookie file 410 within permanent storage 406 in response to a user input selecting these cookies for retention. Other cookies within temporary memory 408 are discarded.

Figure 5:
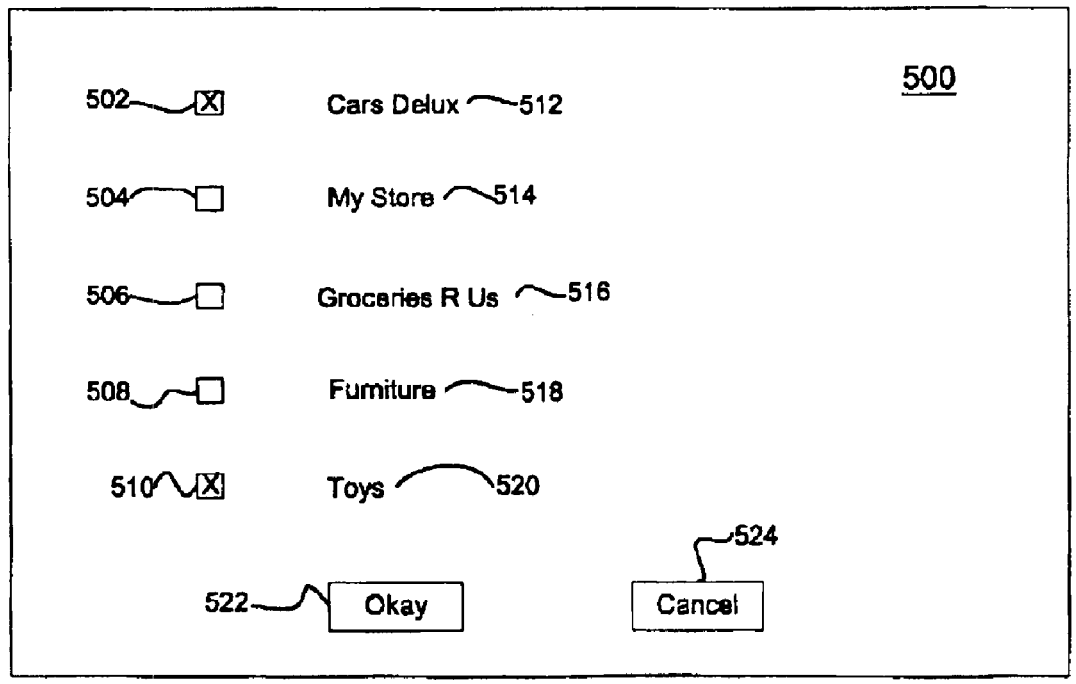
FIG. 5 is a menu displaying a list of cookies in which the present invention may be implemented.

With reference to FIG. 5, a menu displaying a list of cookies is shown in which the present invention may be implemented. Menu 500 includes check boxes 502–510 associated with fields 512–520 with each field identifying a cookie that has been received during the current session. In these examples, the identifications of cookies in fields 512–520 are obtained from the URLs for the source of the cookies. Of course other identifiers may be used depending on the particular implementation.

In this example, the user accepts a cookie that has been passed to the user's computer system by entering a mark in a check box next to the cookie to be permanently stored. Cookies not marked by the user in menu 500 are discarded. In this manner, the user is able to store the selected cookies and disregard the rest of the cookies. The user may decide to save all of the cookies, some of the cookies, or none of the cookies through menu 500. When the user has finished making selections in menu 500, those selections may be accepted by pressing "Okay" button 522. The selections may be discarded by pressing "Cancel" button 524.

Turning to FIG. 6, a flowchart of a process for managing receipt of cookies is depicted in accordance with a preferred embodiment of the present invention. The process illustrated in FIG. 6 may be implemented in a browser, such as browser 300 in FIG. 3.

During the current session, a determination is made as to whether a cookie has been received (step 600). If a cookie is not received, the process returns to step 600. When a cookie is received, the cookie is prevented from being permanently stored in a cookie file (step 602). The cookie is stored in a temporary storage, such as a temporary file or temporary memory 408 in FIG. 4. In these examples, the cookie is not stored in a file normally used to retain cookies for the browser. The cookie is tagged as accepted (step 606). A protocol is present that is used by the browser/server to determine capabilities. However, once the capabilities have been established and the browser has indicated that it accepts cookies, then the server simply sends them with the understanding that the browser is going to handle them. This handling of the cookie allows for it to be used in requests made to a Web site, dependent upon that cookie, to operate properly. A determination is made as to whether the current session has been requested to be terminated (step 608). The session terminates when the execution of the browser ends. Execution of the browser ends, in these examples, when the user clicks "close". If the current session is not in the act of being terminated, process returns to step 600 as described above. Otherwise, the cookies are processed (step 610). Step 610 happens once the browser has requested to close the session, but before the browser is actually terminated. The processing of the cookies involves presenting received cookies to the user to determine which cookies, if any, should be retained. The user may request to process the cookie list at any time and continue to use the browser afterwards. Closing the browser forces the processing of the cookies using the mechanism of the present invention. A user option is present to initiate these processes at any other time.

As represented in FIG. 7, a flowchart of a method for processing cookies is depicted in accordance with a preferred embodiment of the present invention. The process depicted in FIG. 7 is a more detailed description of step 610 in FIG. 6.

The process begins by generating a list of cookies received in the current session (step 700). The list of cookies from the current session is displayed to the user (step 702). User input is received to indicate which cookies to store in a permanent storage, such as permanent storage 406 in FIG. 4 (step 704). The cookies marked for permanent storage, as depicted in FIG. 5, are identified (step 706). The identified cookies are then saved in permanent storage, a cookie file, database, registry, or wherever the browser stores persistent data (step 708). Cookies that are not marked for permanent storage are discarded (step 710) with the process terminating thereafter.

Thus, the present invention provides a method, apparatus, and computer implemented instructions to delay the permanent storage of cookies received from another computer until the user approves the permanent storage. The mechanism of the present invention affords the user the opportunity to view and approve the permanent storage of cookies on the user's computer. The mechanism accepts cookies or tag cookies as accepted is needed so that Web sites, which need the cookies, can function properly. The cookies are temporarily stored so that the data from the cookie is available to a Web site to allow the user to properly access Web sites requiring cookies. When the session for the browser terminates, part of the termination of the session includes presenting cookies received during the session to the user for a determination as to which cookie should be retained. Thus, the present invention provides a mechanism to restrict access to resources on a user's computer. In this manner, the user is not required to approve the acceptance of a cookie each time a cookie is presented to the browser as in currently available systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. In the depicted examples, the cookie is presented as part of an HTTP request received at the browser. The mechanism of the present invention may be applied to other methods used to send cookies to a browser. For example, cookies embedded within HTML pages or Java scripts also may be handled using the process of the present invention. In each case, the cookies will be accepted and placed in a temporary storage and not in a permanent storage without approval from the user at a time when the session ends. Of course, this presentation and approval process may occur at other times other than the termination of the session depending on the particular implementation. For example, the user may initiate an approval or review process of cookies received during a session.

Further, the illustrated examples place the cookies in a temporary memory, such as a system random access memory. These cookies received during a session also may be placed in a other types of temporary storage, such as a temporary file that is deleted or emptied when the session terminates. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method in a data processing system for managing cookies, the method comprising:

receiving a request to accept a cookie;

accepting the cookie;

storing the cookie only in a temporary data store within the data processing system;

presenting a list unsaved cookies of and selectively saving a portion of the unsaved cookies, within the list of unsaved cookies, to a permanent data storage in response to a user input as to which of the unsaved cookies in the list of unsaved cookies are to be saved.

2. The method of claim 1, wherein the receiving, accepting, and storing steps are performed in a browser executing on the data processing system.

3. The method of claim 2 further comprising:

discarding the cookie when the browser terminates execution, if the cookie is not selected, from the list of unsaved cookies, as being a cookie to be saved in the permanent data storage.

4. The method of claim 1, wherein the presenting step and selectively saving step are initiated when a browser session terminates.

5. The method of claim 1, wherein the presenting step and selectively saving step are initiated in response to a user input.

6. The method of claim 1, wherein the temporary data store is one of a random access memory or a temporary file on a hard disk drive.

7. A computer-implemented method in a data processing system for managing cookies, the method comprising:

receiving a cookie during a browser program session;

storing the cookie in a temporary data store within the data processing system only for a duration of the browser program session;

presenting a list of cookies received during the browser program session;

selectively saving a particular cookie within the list of cookies to a permanent data storage in response to a user input indicating the particular cookie is to be retained; and discarding, after the browser program session terminates, cookies in the list of cookies that are not selected for saving to the permanent data storage.

8. The method of claim 7, wherein the particular cookie is stored in a cookie file in the permanent data storage instead of discarding the cookie if a user input indicates that the particular cookie is to be retained.

9. The method of claim 7, wherein the temporary data store is a random access memory.

10. The method of claim 7, wherein the presenting step is activated in response to a signal to terminate the browser program session.

11. A computer-implemented method for managing cookies in a data processing system, the method comprising:

accepting and accumulating cookies without immediately saving the cookies during a session;

presenting a list of the accepted and accumulated cookies;

receiving a user selection of zero or more cookies from the list of accepted and accumulated cookies; and saving the selected cookies, accumulated during the session, to a permanent data storage.

12. A data processing system comprising:

a bus system;

a communications unit connected to the bus system;

a memory connected to the bus system, wherein the memory includes a set of instructions; and a processing unit connected to the bus system, wherein the processing unit executes the set of instructions to receive a request to accept a cookie; accept the cookie; store the cookie only in a temporary data store within the data processing system; present a list of unsaved cookies; and selectively save a portion of the unsaved cookies, within the list of unsaved cookies, to a permanent data storage in response to a user input as to which of the unsaved cookies in the list of unsaved cookies are to be saved.

13. A data processing system comprising:

a bus system;

a communications unit connected to the bus system;

a memory connected to the bus system, wherein the memory includes set of instructions; and a processing unit connected to the bus system, wherein the processing unit executes the set of instructions to receive a cookie during a browser program session, store the cooking in a temporary data store within the data processing system only during a duration of the browser program session; present a list of cookies received during the browser program session; selectively save a particular cookie within the list of cookies to a permanent data storage in response to a user input indicating the particular cookie is to be retained; and discard after the browser program session terminates, cookies in the list of cookies that are not selected for saving to the permanent data storage.

14. A data processing system for managing cookies, the data processing system comprising:

receiving means for receiving a request to accept a cookie;

accepting means for accepting the cookie;

storing means for storing the cookie only in a temporary data store within the data processing system;

presenting means for presenting a list of unsaved cookies; and selectively saving means for selectively saving a portion of the unsaved cookies, within the list of unsaved cookies, in response to a user input as to which of the unsaved cookies in the list of unsaved cookies are to be saved.

15. The data processing system of claim 14, wherein the receiving, accepting, and storing means are operate with a browser executing on the data processing system.

16. The data processing system of claim 15 further comprising:

discarding means for discarding the cookie when the browser terminated execution if the cookie is not part of the portion of unsaved cookies selected to be saved.

17. The data processing system of claim 14, wherein the presenting means and selectively saving means are initiated when a browser session terminates.

18. The data processing system of claim 14, wherein the presenting means and selectively saving means are initiated in response to a user input.

19. The data processing system of claim 14, wherein the temporary data store is one of a random access memory or a temporary file on a hard disk drive.

20. A data processing system for managing cookies, the data processing system comprising:

receiving means for receiving a cookie during a browser program session;

storing means for storing the cookie in a temporary data store within the data processing system only for a duration of the browser program session;

presenting means for presenting a list of cookies received during the browser program session;

selectively saving means for selectively saving a particular cookie within the list of cookies to a permanent data storage in response to a user input indicating the particular cookie is to be retained; and discarding means for discarding, after the browser program session terminates, cookies in the list of cookies that are not selected for saving to the permanent data storage.

21. The data processing system of claim 20, wherein the particular cookie is stored in a cookie file in the permanent data storage instead of discarding the cookie if a user input indicates that the particular cookie is to be retained.

22. The data processing system of claim 20, wherein the temporary data store is a random access memory.

23. The data processing system of claim 20, wherein the presenting means is activated in response to a signal to terminate the browser program session.

24. A data processing system for managing cookies in a data processing system, the data processing system comprising:

accepting means for accepting and accumulating cookies without immediately saving the cookies during a session;

presenting means for presenting a list of unsaved cookies; and selectively saving means for selectively saving a portion of the unsaved cookies, within the list of unsaved cookies, accumulated during the session based on a user selection of the portion of the unsaved cookies from the list of unsaved cookies.

25. A computer program product in a computer readable medium for managing cookies, the computer program product comprising:

first instructions for receiving a request to accept a cookie;

second instructions for accepting the cookie;

third instructions for storing the cookie only in a temporary data store within the data processing system fourth instructions for presenting a list of unsaved cookies; and fifth instructions for selectively saving a portion of the unsaved cookies, within the list of unsaved cookies, in response to a user input as to which of the unsaved cookies in the list of unsaved cookies are to be saved.

26. A computer program product in a computer readable medium for managing cookies, the computer program product comprising:

first instructions for receiving a cookie during a browser program session;

second instructions for storing the cookie within the data processing system only for a duration of the browser program session; and third instructions for presenting a list of cookies received during the browser program session;

fourth instructions for selectively saving a particular cookie within the list of cookies to a permanent data storage in response to a user input indicating the particular cookie is to be retained; and fifth instructions for discarding, after the browser program sessions terminates, cookies in the list of cookies that are not selected for saving to the permanent data storage.

27. A computer program product in a computer readable medium for managing cookies in a data processing system, the computer program product comprising:

first instructions for accepting and accumulating cookies without immediately saving the cookies during a session;

second instructions for presenting means for presenting a list of unsaved cookies; and third instructions for selectively saving a portion of the unsaved cookies, within the list of unsaved cookies, accumulated during the session based on a user selection of the portion of the unsaved cookies from the list of unsaved cookies.

28. A method in a data processing system for managing cookies during a browser session on a client enabled to be communicatively connected to a plurality of servers over a network, the method comprising:

receiving at least one request to accept at least one cookie during the browser session;

accepting each of the at least one cookie;

storing, initially, each of the at least one cookie exclusively in a temporary data store within the data processing system;

displaying, in response to a signal to terminate the browser session, a list of cookies temporarily stored during the browser session; and storing at least one selected cookie in persistent storage in response to user input of a selection from the displayed list.

29. A data processing system running a browser program enabled to be communicatively connected to a plurality of servers over a network, the data processing system comprising:

means for receiving at least one request to accept a cookie during a browser session;

means for accepting each of the at least one cookie;

a temporary store for initially exclusively storing each of the it least one cookie;

means for displaying, in response to a signal to terminate the browser session, a list of cookies temporarily stored during the browser session; and means for storing at least one selected cookie in persistent storage in response to user input of a selection from the displayed list.

30. A computer program having computer readable instruction means on a computer usable medium for managing cookies during a communication session with at least one of a plurality of servers over a network, comprising:

instruction means for enabling receipt of at least one request to accept a cookie during the browser session;

instruction means for enabling acceptance of each of the at least one cookie;

instructions means for storing, initially, each of the at least one cookie exclusively in a temporary data store within the data processing system;

instructions means for enabling a display, in response to a signal to terminate the browser session, of a list of cookies temporarily stored during the browser session; and instruction means for storing at least one selected cookie in persistent storage in response to user input of a selection from the displayed list.

* * * * *

UNITED STATES PATENT AND TRADEMARK OFFICE
CERTIFICATE OF CORRECTION

PATENT NO. : 6,928,440 B2 Page 1 of 1
APPLICATION NO. : 09/838364
DATED : August 9, 2005
INVENTOR(S) : Cordray et al.

It is certified that error appears in the above-identified patent and that said Letters Patent is hereby corrected as shown below:

Col. 9, line 1: after "list" delete "unsaved cookies of" and insert --of unsaved cookies;--.

Signed and Sealed this

Nineteenth Day of December, 2006

JON W. DUDAS
*Director of the United States Patent and Trademark Office*